(12) United States Patent
Cleary et al.

(10) Patent No.: US 8,091,348 B2
(45) Date of Patent: Jan. 10, 2012

(54) METHOD AND APPARATUS FOR EXHAUST AFTERTREATMENT IN AN INTERNAL COMBUSTION ENGINE

(75) Inventors: David J. Cleary, Shanghai (CN); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 556 days.

(21) Appl. No.: 12/265,981

(22) Filed: Nov. 6, 2008

(65) Prior Publication Data

US 2010/0107611 A1   May 6, 2010

(51) Int. Cl.
*F01N 3/00* (2006.01)

(52) U.S. Cl. .............. 60/297; 60/274; 60/288; 60/292; 60/295; 60/299

(58) Field of Classification Search .............. 60/274, 60/286, 287, 288, 295, 297, 299, 292, 324
See application file for complete search history.

(56) References Cited

U.S. PATENT DOCUMENTS

| | | | | |
|---|---|---|---|---|
| 5,331,809 A | * | 7/1994 | Takeshima et al. | 60/288 |
| 5,349,816 A | * | 9/1994 | Sanbayashi et al. | 60/277 |
| 5,517,820 A | * | 5/1996 | Kuroda et al. | 60/274 |
| 5,582,005 A | * | 12/1996 | Wunderlich et al. | 60/297 |
| 6,014,859 A | * | 1/2000 | Yoshizaki et al. | 60/285 |
| 6,212,885 B1 | * | 4/2001 | Hirota et al. | 60/288 |

FOREIGN PATENT DOCUMENTS

DE   19918875 A1   10/1999

* cited by examiner

*Primary Examiner* — Binh Q Tran

(57) ABSTRACT

A method and system for managing an exhaust gas feedstream from an internal combustion engine operative lean of stoichiometry includes steps and apparatus for diverting exhaust around a three-way catalytic converter during NOx adsorber regeneration thereby increasing reductants available in the NOx adsorber to react with the adsorbed NOx.

13 Claims, 3 Drawing Sheets

METHOD AND APPARATUS FOR EXHAUST AFTERTREATMENT IN AN INTERNAL COMBUSTION ENGINE

TECHNICAL FIELD

This disclosure relates to operation and control of internal combustion engines selectively operative lean of stoichiometry and associated exhaust aftertreatment systems.

BACKGROUND

The statements in this section merely provide background information related to the present disclosure and may not constitute prior art.

Operating an internal combustion engine under lean of stoichiometry conditions can improve fuel efficiency, but may increase NOx emissions. Known aftertreatment systems for internal combustion engines operating lean of stoichiometry can include a three-way catalytic converter upstream of a lean-NOx reduction catalyst, also referred to as a lean NOx trap (hereafter 'LNT device'), which can be used in concert with other exhaust aftertreatment devices. Known three-way catalytic converters ('TWC') function to oxidize engine-out hydrocarbons ('HC') and carbon monoxide ('CO'), and reduce nitrides of oxygen ('NOx') emissions during stoichiometric engine operation and oxidize HC and CO emissions during lean operation.

A LNT device adsorbs NOx emissions during lean engine operation and preferably operates within about a 250° C. to 450° C. temperature range with effectiveness decreasing above and below that temperature range. Effectiveness of known LNT devices can be reduced due to exposure to elements present in fuel, including sulfur. A LNT device requires periodic regeneration to desorb and reduce adsorbed NOx elements. Regenerative techniques can include operating the spark-ignition engine at an air/fuel ratio that is rich of stoichiometry for a period of time.

During engine operation, an oxygen storage capacity (hereafter 'OSC') in the TWC can become saturated with oxygen during lean engine operation. During an initial portion of the regeneration process, oxygen stored in the TWC oxidizes reductants (e.g. HC, CO, H2) emitted by the engine and emits the processed mixture to the LNT device. This air/fuel mixture causes the LNT device to desorb stored NOx. As the reductants are consumed in the TWC during the initial portion of the regeneration process, desorbed NOx emissions may escape.

Known regeneration methods include running the engine rich of stoichiometry to generate reductants which react with stored NOx to regenerate the LNT. A significant portion of the reductants is consumed by the oxygen stored in the TWC. Additionally, the rich air/fuel ratio necessary to neutralize the oxygen stored in the TWC results in a delivery delay of reductants to the LNT further decreasing NOx reduction efficacy.

SUMMARY

An exhaust aftertreatment system is fluidly connected to an internal combustion engine and signally connected to a control module. The system consists of a three-way catalytic converter with an output exhaust tube, a flow diverter valve operatively connected to the engine and fluidly connected upstream from the three-way catalytic converter, an exhaust flow tube having a first end fluidly connected to the diverter valve and a second end fluidly connected to the output exhaust tube of the three way catalytic converter, a catalyzed NOx adsorber device fluidly connected to the output tube of the three way catalytic converter, and a NOx sensing device connected downstream of the catalyzed NOx adsorber device.

A method for managing an exhaust gas feedstream includes operating the engine and monitoring the exhaust gas feedstream. The exhaust gas feedstream is selectively directed through the three-way catalytic converter and through the catalyzed NOx adsorber device based upon the monitored exhaust gas feedstream. And, the exhaust gas feedstream is selectively diverted around the three-way catalytic converter to the catalyzed NOx adsorber device based upon the monitored exhaust gas feedstream.

BRIEF DESCRIPTION OF THE DRAWINGS

One or more embodiments will now be described, by way of example, with reference to the accompanying drawings, in which.

DETAILED DESCRIPTION

Figure 1:
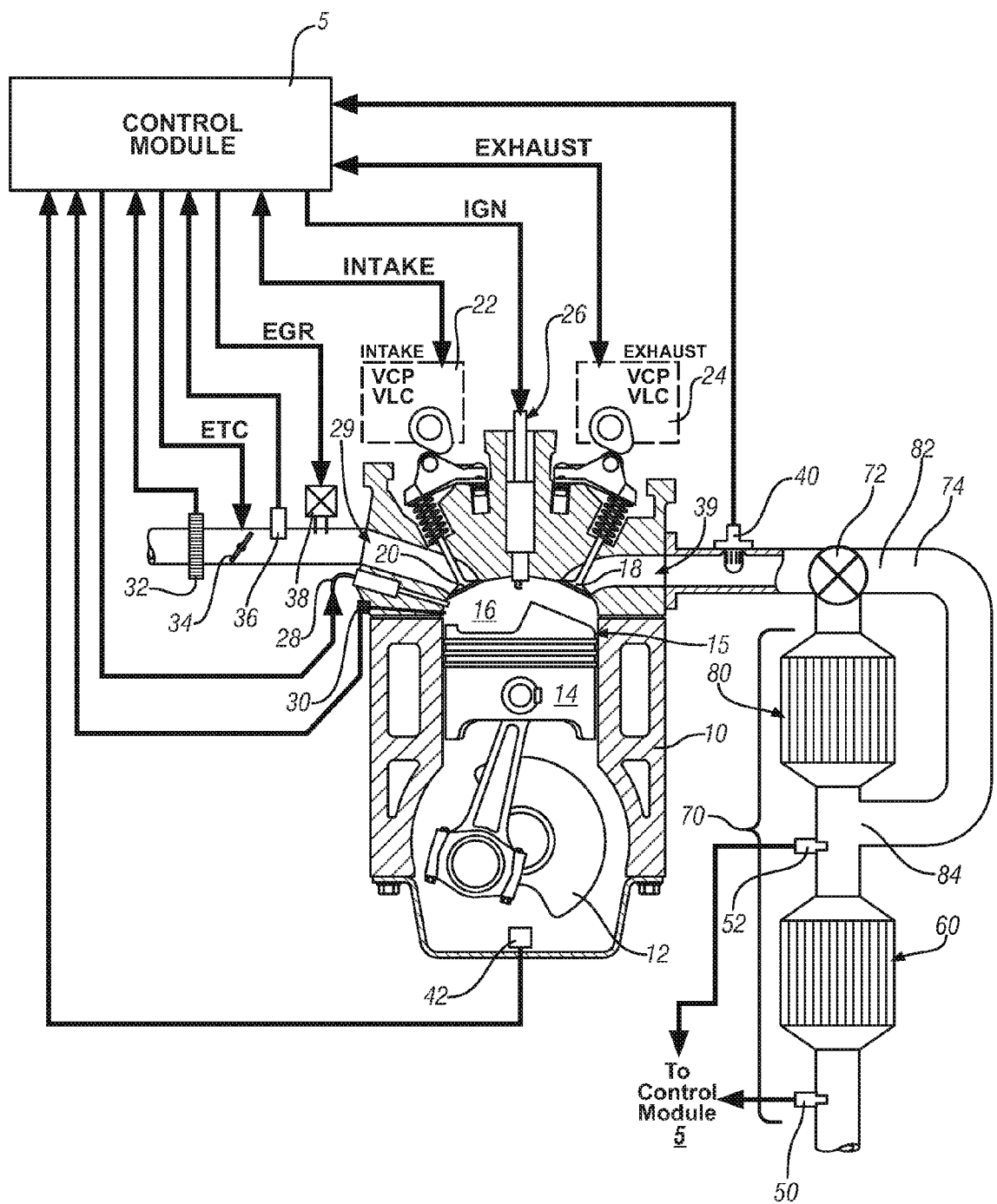
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10, an accompanying control module 5, and an exhaust aftertreatment system 70 that have been constructed in accordance with an embodiment of the disclosure. The engine 10 may be selectively operative in a plurality of combustion modes, including a controlled auto-ignition combustion mode, a homogeneous spark-ignition combustion mode, and a stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal ('ETC') from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation ('EGR') valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (hereafter 'VLC') devices. The variable lift control devices are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (hereafter 'VCP'), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5 for example through camshaft rotation position sensors for the intake camshaft (not shown) and the exhaust camshaft (not shown).

The intake and exhaust VCP/VLC systems 22 and 24 have limited ranges of authority over which opening and closing of the intake and exhaust valves 18 and 20 can be controlled. VCP systems can have a range of phasing authority of about 60°-90° of cam shaft rotation, thus permitting the control module 5 to advance or retard opening and closing of one of the intake and exhaust valves 20 and 18. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into one of the combustion chambers 16, in response to a signal from the control module 5. The fuel injectors 28 are supplied pressurized fuel from a fuel distribution system (not shown).

The engine 10 includes a spark-ignition system by which spark energy is provided to a spark plug 26 for igniting or assisting in igniting cylinder charges in each of the combustion chambers 16 in response to a signal ('IGN') from the control module 5.

The engine 10 is equipped with various sensing devices for monitoring engine operation, including a crank sensor 42 having output ('RPM') and operative to monitor crankshaft rotational position, i.e., crank angle and speed, a combustion sensor 30 adapted to monitor combustion and an exhaust gas sensor 40 adapted to monitor exhaust gases, typically an air/fuel ratio sensor. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (hereafter 'IMEP') for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing includes NVO and lift of exhaust valve reopening (in an exhaust rebreathing strategy). The control module 5 is adapted to receive input signals from an operator (e.g., a throttle pedal position and a brake pedal position) to determine an operator torque request and from the sensors indicating the engine speed and intake air temperature, and coolant temperature and other ambient conditions.

The control module 5 is preferably a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory and executed to provide the respective functions of each computer. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. The control module 5 can operate to turn the engine on and off during ongoing vehicle operation, and can operate to selectively deactivate a portion of the combustion chambers or a portion of the valves through control of fuel and spark and valve deactivation.

The exhaust aftertreatment system 70 in this embodiment comprises a three-way catalytic converter 80 (hereafter 'TWC'), a catalyzed NOx adsorber 60 (hereafter 'LNT device'), a flow diverter valve 72, and a bypass tube 74. The aftertreatment system 70 is fluidly connected to the internal combustion engine 10 and signally and operatively connected to the control module 5. The diverter valve 72 is fluidly connected to the engine 10, the three-way catalytic converter 80, and the bypass tube 74, and operatively connected to the control module 5. The flow diverter valve 72 can control flow of the exhaust gas feedstream directly though the three-way catalytic converter 80 to the LNT device 60 and can divert exhaust gas feedstream around the three-way catalytic converter 80 and directly into the catalyzed LNT device 60 from the engine 10.

The three-way catalytic converter 80 is fluidly connected downstream from the diverter valve 72 and upstream from the LNT device 60. The LNT device 60 is fluidly connected downstream from the three-way catalytic converter 80 and the bypass tube 74. The bypass tube 74 is fluidly connected on a first end 82 to the diverter valve 72 and fluidly connected on a second end 84 to the input of the LNT device 60. Exhaust gas sensors 50 and 52 are disposed to monitor the feedstream and signally connected to the control module. The exhaust gas sensors 50 and 52 can be any of air/fuel sensors, NOx sensors, and oxygen sensors.

The LNT device 60 is operative to adsorb nitrides of oxygen in the exhaust gas feedstream, with the amount of adsorption based upon temperature, flowrate, and air/fuel ratio of the exhaust gas feedstream and amount of nitrides of oxygen already adsorbed thereon.

The LNT device 60 preferably comprises a substrate having a washcoat containing catalytically active material. The substrate preferably comprises a monolithic element formed from cordierite with a cell density that is preferably 64-96 cells per square centimeter (400 to 600 cells per square inch), and a wall thickness of three to seven mils. The cells of the substrate comprise flow passages through which exhaust gas flows to contact the catalytically active materials of the washcoat to effect adsorption and desorption of nitrides of oxygen, oxygen storage, and oxidization and reduction of constituents of the exhaust gas feedstream. The washcoat preferably contains alkali elements, e.g., Li, Na, and K, and alkali earth metal compounds, e.g., Ba, Mg, Ca, and Sr, and/or lanthanum group metals e.g., La, and Ce operative to store NOx as nitrides of oxygen that are generated during engine operation that is lean of stoichiometry. The washcoat can also contain catalytically active materials, i.e., platinum-group metals (hereafter 'PGM') comprising Pt, Pd, and Rh, and additives (e.g., Ce, Zr, La). When the exhaust gas feedstream is rich of stoichiometry there are excess reductants and adsorbed nitrides of oxygen are not stable and decompose to release stored NOx. The reductants in the exhaust gas feedstream preferably comprise HC molecules, hydrogen molecules, and CO which are generated when the engine is operated at a rich air/fuel ratio. The washcoat adsorbs nitrides of oxygen during lean engine operation, and desorbs and reduces nitrides of oxygen during engine operation that generates a rich exhaust gas feedstream. The desorbed nitrides of oxygen are reduced by the excess reductants at PGM catalyst sites. The LNT device 60 can saturate with adsorbed nitrides of oxygen, thus reducing its effectiveness. The LNT device 60 can be regenerated by desorbing the adsorbed nitrides of oxygen in the presence of the aforementioned reductants by reacting with the reductants to reduce to nitrogen and other inert elements.

As shown in FIG. 1, the aftertreatment system 70 preferably includes an air/fuel sensor 40 upstream of the diverter valve 72, and sensor 52 preferably comprising an air/fuel ratio sensor upstream of the LNT device 60 and downstream of the second end 84 of the bypass tube 74. The aftertreatment system 70 may also include sensor 50 comprising a NOx sensor downstream of the LNT device 60 that is preferably capable to measure air/fuel ratio of the exhaust gas feedstream. Alternatively, sensor 50 can comprise an air/fuel ratio sensor downstream of the LNT device 60. In one embodiment, one NOx sensor and one air/fuel ratio sensor may both be disposed downstream of the LNT device. In an alternate embodiment, a single sensor may be adapted to provide functionality as both a NOx sensor and an air/fuel ratio sensor. The sensors 50 and 52 each generate output signals monitored by the control module 5 which can be used for control and diagnostics of the engine 10 and the aftertreatment system 70.

Figure 2:
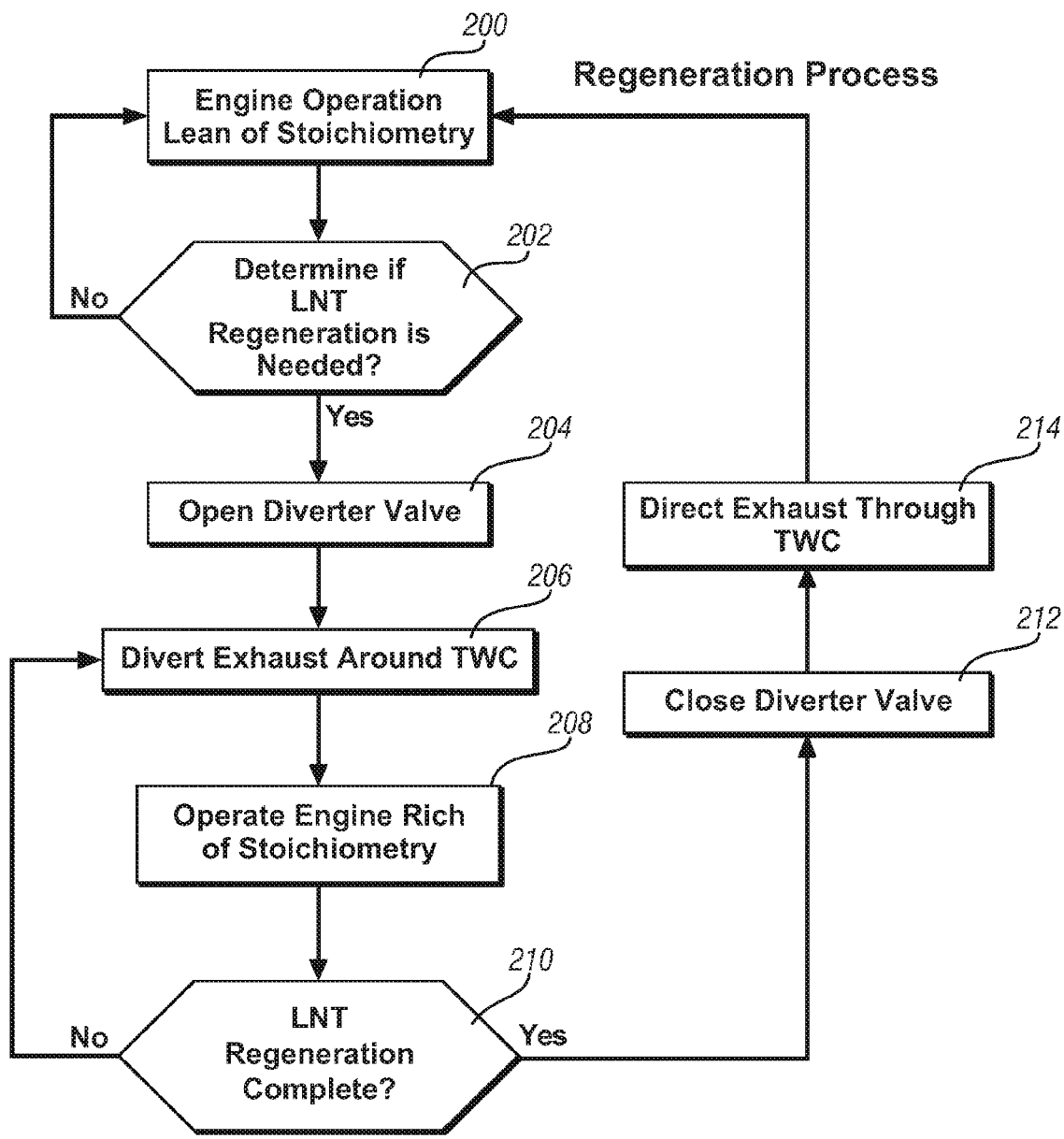
FIG. 2 is a flow chart that illustrates exhaust management during LNT regeneration, in accordance with the present disclosure.

FIG. 2 depicts a method for managing an exhaust gas feedstream from the engine 5 during ongoing powertrain operations, preferably executed as one or more algorithms in the control module 5. When the engine 10 is running lean of stoichiometry, exhaust is directed through the TWC 80 to the LNT device 60 (200). The control module 5 monitors the sensors, including the NOx sensor 50. The NOx sensor 50 monitors the amount of NOx emissions emitted from the LNT device 60 and the air/fuel ratio, and signals the control module 5. When the NOx sensor 50 indicates that a predetermined threshold of NOx emissions are emitted from the LNT device 60, then the control module 5 may command LNT regeneration, preferably prior to saturation of the LNT and NOx breakthrough (202). One skilled in the art appreciates that NOx breakthrough can be monitored with a mathematical model in place of or in conjunction with the NOx sensor 50. When the model indicates NOx breakthrough, the control module 5 can command LNT regeneration (202).

During LNT regeneration, the control module 5 can command the diverter valve 72 to open (204). Once the diverter valve 72 is open the exhaust gas feedstream is diverted around the TWC 80 to the LNT device 60 (206). By diverting the exhaust gas feedstream around the TWC 80 the reductants produced by the engine 10 are free to desorb NOx emissions stored in the LNT device 60, thereby decreasing the amount of reductants needed to achieve LNT regeneration and improving fuel efficiency.

At the start of LNT regeneration, the engine 10 can be commanded to produce an exhaust gas feedstream that is rich of stoichiometry to generate the reductants (208). The LNT regeneration can include injecting a first fuel pulse into the combustion chamber 16 during the compression stroke. The mass of fuel injected during the first fuel pulse is determined based upon an amount sufficient to operate the engine 10 to meet the operator torque request. Subsequent fuel pulses can be injected to the combustion chamber 16 during the combustion cycle. The subsequent fuel pulses can be injected during other strokes of the combustion cycle, e.g., the power stroke or the exhaust stroke, to generate an exhaust gas feedstream having an air/fuel ratio which is rich of stoichiometry to act as reductants to regenerate the LNT device 60.

The control module 5 determines that the LNT device 60 has been regenerated (210). Concurrent with regeneration and the engine 10 transitioning operation from lean of stoichiometry to rich of stoichiometry, the control module 5 can monitor NOx and/or the air/fuel ratio downstream of the LNT device 60 using sensor 50 to monitor air/fuel ratio and/or NOx emissions. When the sensor 50 indicates a predetermined air/fuel ratio or a predetermined NOx threshold, the control module 5 may determine that regeneration is complete. Alternatively, the control module 5 can initiate regeneration and operate the engine 10 rich of stoichiometry for a predetermined time interval. Once the time period elapses, the control module 5 determines that regeneration is complete, and discontinues operating the engine 10 rich of stoichiometry.

Once the control module 5 determines that regeneration is complete the control module 5 commands the diverter valve 72 to close (212). Once the diverter valve 72 is closed, the exhaust gas feedstream is directed through the TWC 80 device to the LNT device 60 (214). The control module 5 may also return engine operation to lean of stoichiometry (200). The control module 5 continues to monitor the NOx sensor 50 downstream of the LNT device 60 to determine when to initiate subsequent LNT regeneration events.

Figure 3:
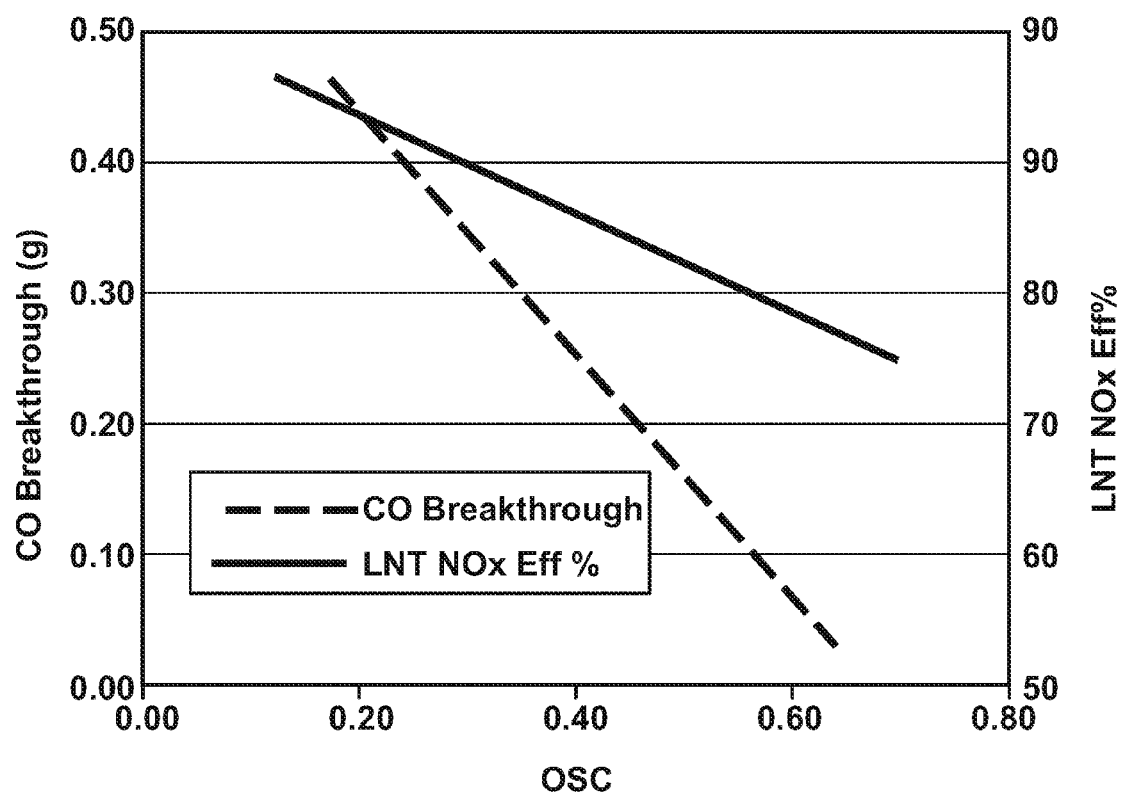
FIG. 3 graphically illustrates CO breakthrough out of the TWC and NOx reduction efficiency for varying oxygen levels in the TWC, in accordance with the present disclosure.

FIG. 3 shows a datagraph depicting CO breakthrough out of the TWC 80, and LNT NOx efficiency plotted as a function of the OSC for the aftertreatment system 70. As the OSC consumes less of the reductants produced by the engine 10, CO breakthrough out of the TWC 80 increases slightly. The CO breakthrough from the TWC 80 reacts with the adsorbed NOx in the LNT device 60 increasing NOx efficiency within the LNT device 60 and decreasing NOx emissions.

The diverter valve 72 and the bypass tube 74 can also be used during an engine start and initial engine operation. During an engine start and initial operation, the engine 10 may operate at stoichiometry or rich of stoichiometry. The exhaust gas feedstream is directed through the TWC 80 to the LNT device 60. As the exhaust gas feedstream passes through the aftertreatment system 70, it heats the TWC 80 to a temperature whereat HC in the exhaust gas feedstream can be oxidized. For the exemplary LNT device 60, NOx absorption and reduction occurs most effectively between a temperature range of about 250° C. to 450° C. Once the LNT device 60 reaches a temperature in the range of 200° C., the control module 5 can command the engine 10 to begin operating at lean of stoichiometry. The exhaust gas feedstream may then be diverted around the TWC 80 for LNT regeneration based upon the NOx indicated downstream of the LNT device 60.

Alternatively, during engine starts at stoichiometry or rich of stoichiometry, the exhaust gas feedstream may be diverted around the TWC 80 until the exhaust gas feedstream heats the LNT device 60 to a predetermined operating temperature. Diverting the exhaust gas feedstream around the TWC 80 may be initiated based upon temperature of the TWC 80, elapsed time from the engine start, and/or engine cycles. Once the control module 5 determines that a predetermined temperature, elapsed time, or a predetermined number engine cycles have been achieved, the exhaust gas feedstream may be diverted to the LNT device 60. Once the LNT device 60 reaches the operating temperature the control module 5 can command the engine 10 to begin operating at lean of stoichiometry, and the diverter valve 72 to direct the exhaust gas feedstream through the TWC 80 to the LNT device 60 until the control module 5 initiates LNT regeneration. This method heats the LNT device 60 to an operating temperature, thereby allowing the engine 10 to begin operating lean of stoichiometry.

The same methods as described hereinabove are applicable to multiple more powertrain systems including powertrain systems with compression ignition, spark-ignition, homogeneous-charge compression-ignition, and spark-ignition direct-injection engines. The methods describe hereinabove are also applicable to powertrain systems which include electrical machines and internal combustion engines that transition among engine off and engine on states during ongoing powertrain operations. Another exemplary powertrain system comprises a belt alternator starter system (BAS). In the BAS system, an engine can be shut OFF during stops and then started for a battery recharge and multiple acceleration situations. The electrical motor may be used to recharge the battery or to provide torque mechanically through the engine during engine acceleration.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for managing an exhaust gas feedstream from an internal combustion engine selectively operative lean of stoichiometry, the method comprising:
   equipping the engine with an exhaust aftertreatment system comprising a three-way catalytic converter fluidly connected to a catalyzed NOx adsorber device;
   operating the engine;
   monitoring the exhaust gas feedstream;
   selectively directing the exhaust gas feedstream through the three-way catalytic converter and through the catalyzed NOx adsorber device based upon the monitored exhaust gas feedstream; and
   selectively diverting the exhaust gas feedstream around the three-way catalytic converter to the catalyzed NOx adsorber device based upon the monitored exhaust gas feedstream;
   wherein monitoring the exhaust gas feedstream comprises monitoring NOx emissions in the exhaust gas feedstream downstream of the catalyzed NOx adsorber device; and
   wherein selectively diverting the exhaust gas feedstream around the three-way catalytic converter to the catalyzed NOx adsorber device based upon the monitored exhaust gas feedstream comprises diverting the exhaust gas feedstream around the three-way catalytic converter to the catalyzed NOx adsorber device when the NOx emissions in the exhaust gas feedstream downstream of the catalyzed NOx adsorber exceeds a predetermined threshold.

2. The method of claim 1, selectively directing the exhaust gas feedstream through the three-way catalytic converter and through the catalyzed NOx adsorber device based upon the monitored exhaust gas feedstream comprises directing the exhaust gas feedstream through the three-way catalytic converter and through the catalyzed NOx adsorber device when the NOx emissions in the exhaust gas feedstream downstream of the catalyzed NOx adsorber is below a predetermined threshold.

3. The method of claim 1, further comprising:
   operating the engine rich of stoichiometry when diverting the exhaust gas feedstream around the three-way catalytic converter to the catalyzed NOx adsorber device.

4. Method for managing an exhaust gas feedstream from an internal combustion engine selectively operative lean of stoichiometry, the method comprising:
   equipping the engine with an exhaust aftertreatment system comprising a three-way catalytic converter fluidly connected to a catalyzed NOx adsorber device;
   operating the engine;
   monitoring the exhaust gas feedstream;
   selectively directing the exhaust gas feedstream through the three-way catalytic converter and through the catalyzed NOx adsorber device based upon the monitored exhaust gas feedstream;
   selectively diverting the exhaust gas feedstream around the three-way catalytic converter to the catalyzed NOx adsorber device based upon the monitored exhaust gas feedstream;
   operating the engine rich of stoichiometry when diverting the exhaust gas feedstream around the three-way catalytic converter to the catalyzed NOx adsorber device;
   monitoring the exhaust gas feedstream downstream of the catalyzed NOx adsorber device comprises monitoring the exhaust gas feedstream downstream of the catalyzed NOx adsorber device with a NOx sensor; and when the NOx sensor indicates NOx emissions below a predetermined threshold:
- transitioning operating the engine rich of stoichiometry to operating the engine lean of stoichiometry;
- discontinuing diverting the exhaust gas feedstream around the three-way catalytic converter to the catalyzed NOx adsorber device; and
- directing the exhaust gas feedstream through the three-way catalytic converter and through the catalyzed NOx adsorber device.

5. Method for managing an exhaust gas feedstream from an internal combustion engine selectively operative lean of stoichiometry, the method comprising:
- equipping the engine with an exhaust aftertreatment system comprising a three-way catalytic converter fluidly connected to a catalyzed NOx adsorber device;
- operating the engine;
- monitoring the exhaust gas feedstream;
- selectively directing the exhaust gas feedstream through the three-way catalytic converter and through the catalyzed NOx adsorber device based upon the monitored exhaust gas feedstream;
- selectively diverting the exhaust gas feedstream around the three-way catalytic converter to the catalyzed NOx adsorber device based upon the monitored exhaust gas feedstream;
- operating the engine rich of stoichiometry when diverting the exhaust gas feedstream around the three-way catalytic converter to the catalyzed NOx adsorber device;
- monitoring the exhaust gas feedstream downstream of the catalyzed NOx adsorber device comprises monitoring the exhaust gas feedstream downstream of the catalyzed NOx adsorber device with an air/fuel sensor; and
- when the air/fuel sensor indicates a predetermined air/fuel ratio:
  - transitioning operating the engine rich of stoichiometry to operating the engine lean of stoichiometry;
  - discontinuing diverting the exhaust gas feedstream around the three-way catalytic converter to the catalyzed NOx adsorber device; and
  - directing the exhaust gas feedstream through the three-way catalytic converter and through the catalyzed NOx adsorber device.

6. The method of claim 1, wherein selectively diverting the exhaust gas feedstream around the three-way catalytic converter to the catalyzed NOx adsorber device based upon the monitored exhaust gas feedstream comprises diverting the exhaust gas feedstream around the three-way catalytic converter to the catalyzed NOx adsorber device for a predetermined time interval.

7. The method of claim 6, further comprising:
operating the engine rich of stoichiometry when diverting the exhaust gas feedstream around the three-way catalytic converter to the catalyzed NOx adsorber device.

8. The method of claim 7, further comprising:
- transitioning operating the engine rich of stoichiometry to operating the engine lean of stoichiometry;
- discontinuing diverting the exhaust gas feedstream around the three-way catalytic converter to the catalyzed NOx adsorber device when the predetermined time interval elapses; and
- directing the exhaust gas feedstream through the three-way catalytic converter and through the catalyzed NOx adsorber device.

9. Method for managing an exhaust gas feedstream from an internal combustion engine selectively operative lean of stoichiometry, the method comprising:
- equipping the engine with an exhaust aftertreatment system comprising a three-way catalytic converter fluidly connected to a catalyzed NOx adsorber device;
- operating the engine;
- selectively diverting the exhaust gas feedstream around the three-way catalytic converter to the catalyzed NOx adsorber device while operating the engine rich of stoichiometry; and
- selectively directing the exhaust gas feedstream through the three-way catalytic converter and through the catalyzed NOx adsorber device while operating the engine lean of stoichiometry;
- wherein selectively diverting the exhaust gas feedstream around the three-way catalytic converter to the catalyzed NOx adsorber device while operating the engine rich of stoichiometry comprises:
  - monitoring the exhaust gas feedstream downstream of the catalyzed NOx adsorber device with an air/fuel sensor;
  - discontinuing diverting the exhaust gas feedstream around the three-way catalytic converter to the catalyzed NOx adsorber device when the air/fuel sensor indicates a predetermined air/fuel ratio;
  - transitioning operating the engine rich of stoichiometry to lean of stoichiometry; and
  - directing the exhaust gas feedstream through the three-way catalytic converter and through the catalyzed NOx adsorber device.

10. Method for managing an exhaust gas feedstream from an internal combustion engine selectively operative lean of stoichiometry, the method comprising:
- equipping the engine with an exhaust aftertreatment system comprising a three-way catalytic converter fluidly connected to a catalyzed NOx adsorber device;
- operating the engine;
- selectively diverting the exhaust gas feedstream around the three-way catalytic converter to the catalyzed NOx adsorber device while operating the engine rich of stoichiometry; and
- selectively directing the exhaust gas feedstream through the three-way catalytic converter and through the catalyzed NOx adsorber device while operating the engine lean of stoichiometry;
- wherein selectively directing the exhaust gas feedstream through the three-way catalytic converter and through the catalyzed NOx adsorber device while operating the engine rich of stoichiometry comprises:
  - monitoring the exhaust gas feedstream downstream of the catalyzed NOx adsorber device with a NOx sensor;
  - discontinuing directing the exhaust gas feedstream through the three-way catalytic converter and through the catalyzed NOx adsorber device when the NOx sensor indicates a predetermined NOx threshold;
  - transitioning operating the engine lean of stoichiometry to rich of stoichiometry; and
  - diverting the exhaust gas feedstream around the three-way catalytic converter to the catalyzed NOx adsorber device.

11. An exhaust aftertreatment system fluidly connected to an internal combustion engine and signally connected to a control module, the system comprising:
- a three-way catalytic converter with an output exhaust tube;

a diverter valve fluidly connected to the engine and fluidly connected upstream from the three-way catalytic converter;

an exhaust flow tube with a first end fluidly connected to the diverter valve and a second end fluidly connected to the output exhaust tube of the three way catalytic converter;

a catalyzed NOx adsorber device fluidly connected to the output tube of the three way catalytic converter;

a NOx sensing device connected downstream of the catalyzed NOx adsorber device the NOx sensing device configured to monitor NOx emissions in the exhaust gas feedstream downstream of the catalyzed NOx adsorber; and the control module configured to control the diverter valve to divert the exhaust gas feedstream around the three-way catalytic converter to the catalyzed NOx adsorber device when the NOx emissions in the exhaust gas feedstream downstream of the catalyzed NOx adsorber exceeds a predetermined threshold.

12. The system of claim 11, wherein the NOx sensing device is configured to monitor an air/fuel ratio of the exhaust gas feedstream downstream of the catalyzed NOx adsorber.

13. The system of claim 11, further comprising the control module configured to control the internal combustion engine at a rich of stoichiometric air/fuel ratio for a period of time determined to substantially regenerate the catalyzed NOx adsorber device.

* * * * *